(12) United States Patent
Scott et al.

(10) Patent No.: US 10,330,805 B2
(45) Date of Patent: Jun. 25, 2019

(54) DEPLOYMENT NETTING FOR GEOPHYSICAL SENSOR OR GEOPHYSICAL SENSOR RECORDING NODE

(71) Applicant: Geophysical Technology, Inc., Bellaire, TX (US)

(72) Inventors: Gary L. Scott, Missouri City, TX (US); Richard A. Degner, Bellaire, TX (US)

(73) Assignee: Geophysical Technology, Inc., Bellaire, TX (US)

( * ) Notice: Subject to any disclaimer, the term of this patent is extended or adjusted under 35 U.S.C. 154(b) by 275 days.

(21) Appl. No.: 15/459,011

(22) Filed: Mar. 15, 2017

(65) Prior Publication Data

US 2017/0184744 A1    Jun. 29, 2017

Related U.S. Application Data

(63) Continuation of application No. PCT/US2015/055847, filed on Oct. 16, 2015.

(60) Provisional application No. 62/065,437, filed on Oct. 17, 2014.

(51) Int. Cl.
*G01V 1/00* (2006.01)
*G01V 1/20* (2006.01)
*G01V 1/16* (2006.01)
*G01V 1/22* (2006.01)

(52) U.S. Cl.
CPC .............. *G01V 1/168* (2013.01); *G01V 1/223* (2013.01); *G01V 1/003* (2013.01); *G01V 2210/1425* (2013.01)

(58) Field of Classification Search
CPC ......... G01V 1/168; G01V 1/1003; G01V 1/20
See application file for complete search history.

(56) References Cited

U.S. PATENT DOCUMENTS

| 4,241,427 A | * | 12/1980 | Swenson | G01V 1/201 |
| | | | | 174/101.5 |
| 4,295,212 A | * | 10/1981 | Swenson | G01V 1/201 |
| | | | | 114/244 |
| 5,315,074 A | | 5/1994 | Berquist | |
| 5,635,710 A | | 6/1997 | Reed et al. | |
| 6,065,540 A | * | 5/2000 | Thomeer | E21B 17/06 |
| | | | | 138/125 |
| 6,148,865 A | * | 11/2000 | Head | B29C 70/222 |
| | | | | 138/123 |

(Continued)

FOREIGN PATENT DOCUMENTS

| CN | 202706006 U | 1/2013 | |
| EP | 1582632 A1 | 10/2005 | |
| EP | 1582632 A1 * | 10/2005 | ............. E02D 1/022 |

OTHER PUBLICATIONS

International Search Report and Written Opinion, International Application No. PCT/US15/55847.

*Primary Examiner* — Jeremy A Luks
(74) *Attorney, Agent, or Firm* — Richard A. Fagin

(57) ABSTRACT

A geophysical sensor deployment sleeve includes an electrically non-conductive fiber woven into a shape of a tube open at one end and closed at the other end. The fiber has a tensile strength such that upward force applied to the open end of the tube is capable of removal of a sensor or sensor recording node disposed in the tube in a hole below a ground surface irrespective of consolidated materials infiltrating and/or covering the tube below ground level.

14 Claims, 5 Drawing Sheets

(56) References Cited

U.S. PATENT DOCUMENTS

| | | | |
|---|---|---|---|
| 6,250,193 B1 * | 6/2001 | Head | B29C 70/222 87/1 |
| 6,706,348 B2 * | 3/2004 | Quigley | B29C 70/086 428/35.9 |
| 6,944,096 B2 * | 9/2005 | Lemenager | G01V 1/16 367/76 |
| 7,180,828 B1 * | 2/2007 | Sommer | G01V 1/201 367/153 |
| 9,715,029 B2 * | 7/2017 | Cho | G01R 1/04 |
| 2004/0144535 A1 | 7/2004 | Kalman et al. | |
| 2009/0071647 A1 | 3/2009 | Vinegar et al. | |
| 2011/0141850 A1 * | 6/2011 | Scott | G01V 1/26 367/50 |

* cited by examiner

DEPLOYMENT NETTING FOR GEOPHYSICAL SENSOR OR GEOPHYSICAL SENSOR RECORDING NODE

CROSS REFERENCE TO RELATED APPLICATIONS

Continuation of International Application No. PCT/US15/55847 filed on Oct. 16, 2015. Priority is claimed from U.S. Provisional Application No. 62/065,437 filed on Oct. 17, 2014.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure is related to the field of geophysical sensing and recording devices deployed in semi-soft ground surfaces, ice and similar environments. More specifically, the disclosure is related to deployment devices for location, signal detection and retrieval of geophysical signals detected by such devices, and retrieval of the devices after signal acquisition and/or recording is completed.

Geophysical sensors known in the art include particle motion responsive sensors such as geophones and accelerometers, and pressure or pressure time gradient sensor such as hydrophones, for detecting seismic energy originating in the Earth's subsurface or reflected from subsurface acoustic impedance boundaries after having seismic energy imparted thereto by a controlled acoustic energy source. Some embodiments of such geophysical sensors may have associated therewith self-contained data recording devices that can operate autonomously. Such devices may be referred to as recording nodes.

Some geophysical sensors and/or recording nodes may be deployed proximate the ground surface for land based geophysical surveys. Some geophysical sensors and/or recording nodes may be deployed into semi-soft surface materials, such as mud proximate the bottom of a shallow body of water, sand in desert and similar geographic areas and in holes bored through ice in geographic areas having ice cover during at least some times of the year. In the foregoing types of geographic areas, it may become difficult to locate and/or retrieve the geophysical sensor and/or recording node after deployment for a length of time; ice can freeze proximate the sensor or node in place, and sand, snow, and/or mud can cover the sensor or node.

DETAILED DESCRIPTION

Figure 1:
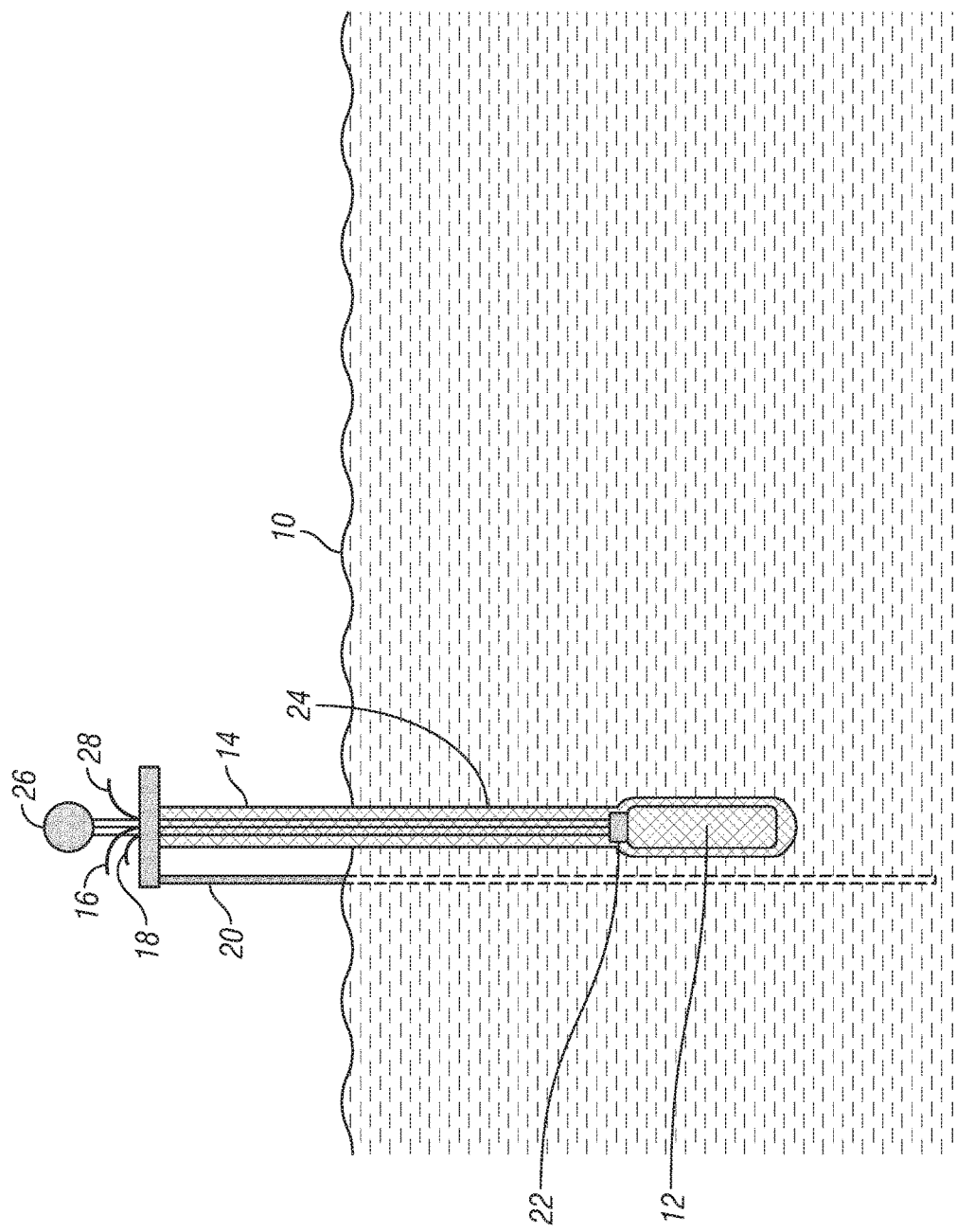
FIG. 1 shows an example embodiment of a sensor or recording node sleeve made from woven, high strength fiber deployed in a hole in ice cover over a subsurface area to be surveyed.

The present disclosure is drawn in general to a structure for a geophysical sensor sleeve or a sensor recording node sleeve that may aid in locating the sensor or node and to help prevent loss of a sensors or sensor recording nodes when the foregoing are deployed in surface or near surface material susceptible to "capturing" the sensor or node by consolidation, packing or freezing, for example. Embodiments of a sensor or sensor node sleeve may be made by fabricating a woven, high strength fiber tube that may be open at one end to enable insertion of a sensor or sensor node. The woven tube may be closed at the other end to stop the sensor or sensor node from moving beyond the closed end of the tube. The fiber woven into the semi-closed tubular shape may be a high strength, electrically non-conductive fiber such as made from braided nylon, polyester, polypropylene, KEVLAR brand fiber, or AMSTEEL brand fiber. KEVLAR is a registered trademark of E. I. du Pont de Nemours and Company, 1007 Market Street Wilmington, Del. 19898. AMSTEEL is a registered trademark of Samson Rope Technologies, Inc., 2090 Thornton Street Ferndale, Wash. 98248.

In some embodiments, the weave of the fiber making up the tube may include an electrical heating element made from, e.g., electrical resistance wire, conductive plastic wire, non-conductive fiber coated at least in part with semiconducting plastic material or other material capable of producing heat when electric current is passed through the material. In one embodiment, heat results from passing current through semiconductive carbon fiber. In such embodiments it may be possible to connect an electrical power source, e.g., a battery, for a selected amount of time to melt a small layer of ice in cases where the sensor or sensor node is deployed in a hole drilled in the surface of an ice layer covering the portion of the subsurface to be surveyed. The heat generated by passing electric current though the electrical heating element in the material will facilitate removal of the sensor or sensor node from the hole in the ice with relatively low tension applied to the above-ice end of the tube structure. The fibers may be strong enough to allow pulling (tensile) force in the range of several thousands of pounds to pull the woven fiber tube and the enclosed sensor or sensor node out of a hole drilled below the ground surface essentially irrespective of the mechanical conditions of the hole after a lengthy deployment of the sensor or sensor node, wherein freezing, compaction and or solid particle infiltration may cause the sensor or sensor node to become tightly lodged in the hole.

In some embodiments, the woven fiber tube structure may also include insulated electrical conductors to communicate signals in electrical form such as satellite geodetic positioning signals, recording timing synchronization (i.e., clock synchronization signals), as well as insulated electrical conductors to provide for two way signal communication between the sensor or sensor node disposed in the woven fiber tube and any other suitable instrument, e.g., a portable or wireless data retrieval and recording unit. Battery charging electrical conductors may also be included in the woven fiber.

The woven material and the electrical conductors and heating wire may continue in length beyond the upper end of the woven fiber tube for a selected length, which for example may be several meters. The extra length may be provided to enable attachment of the tube material to an above-surface anchor, or a pole with antenna(s) thereon to remotely electronically service (e.g., data download, clock synchronization, acquisition sequence reprogramming and recording system diagnostic testing) the sensor or sensor node deployed in the woven fiber tube, and to provide an electrical connection location for connecting an electrical power source to the heating wire. Non-limiting examples of the foregoing communication between a hand held service and/or data transcription device and a sensor recording node are described in U.S. Patent Application Publication No. 2011/0141850 filed by Scott et al.

Referring to FIG. 1, an example embodiment of a sensor or sensor node sleeve according to the present disclosure is shown. The sensor or sensor node sleeve ("sensor sleeve") 14 may be made from woven, high strength, electrically non-conductive fiber as explained above. The sensor sleeve 14 may be closed at its bottom end to retain a sensor or sensor recording node 12. In other embodiments, to be explained below, the sensor or sensor sleeve 14 may be open at both ends. The sensor sleeve 14 may be open at its upper end to enable insertion therein of the sensor or sensor recoding node 12. In some embodiments, the sensor or sensor node 12 may include an electrically insulating cap 22 disposed thereon and in electrical communication with the sensor or circuitry in the sensor node to enable electromagnetic transfer of power and signals between electrical cabling 16, 18 woven into the braid of the sensor sleeve 14. Electromagnetic communication of power and signals may be performed using an apparatus as described in the Scott et al. '850 publication cited hereinabove, or, using an electromagnetic coupling as set forth in U.S. Pat. No. 4,806,928 issued to Veneruso.

The example embodiment shown in FIG. 1 may provide that the sensor or sensor recording node 12 and the sensor sleeve 14 may be disposed in a hole 24 drilled through the surface 10 of ice cover above an area of the subsurface to be surveyed. The length of the sensor sleeve 14 may be selected such that when the sensor or sensor recording node is fully deployed in the hole 24, a selected length of the sensor sleeve 14 extends about the surface 10. The selected length of the sensor sleeve 14 may be coupled to a stand or support 20 for easy visual location of the sensor sleeve 14. The previously mentioned electrical cables for battery charging power 18, and for signal communication 16 may be provided in some embodiments. In some embodiments, electromagnetic communication between a sensor node 12 and a remote or other sensor recording device (not shown) may be facilitated by providing an antenna 26. Electrical cables to operate the heating element described above are shown at 28.

Figure 2:
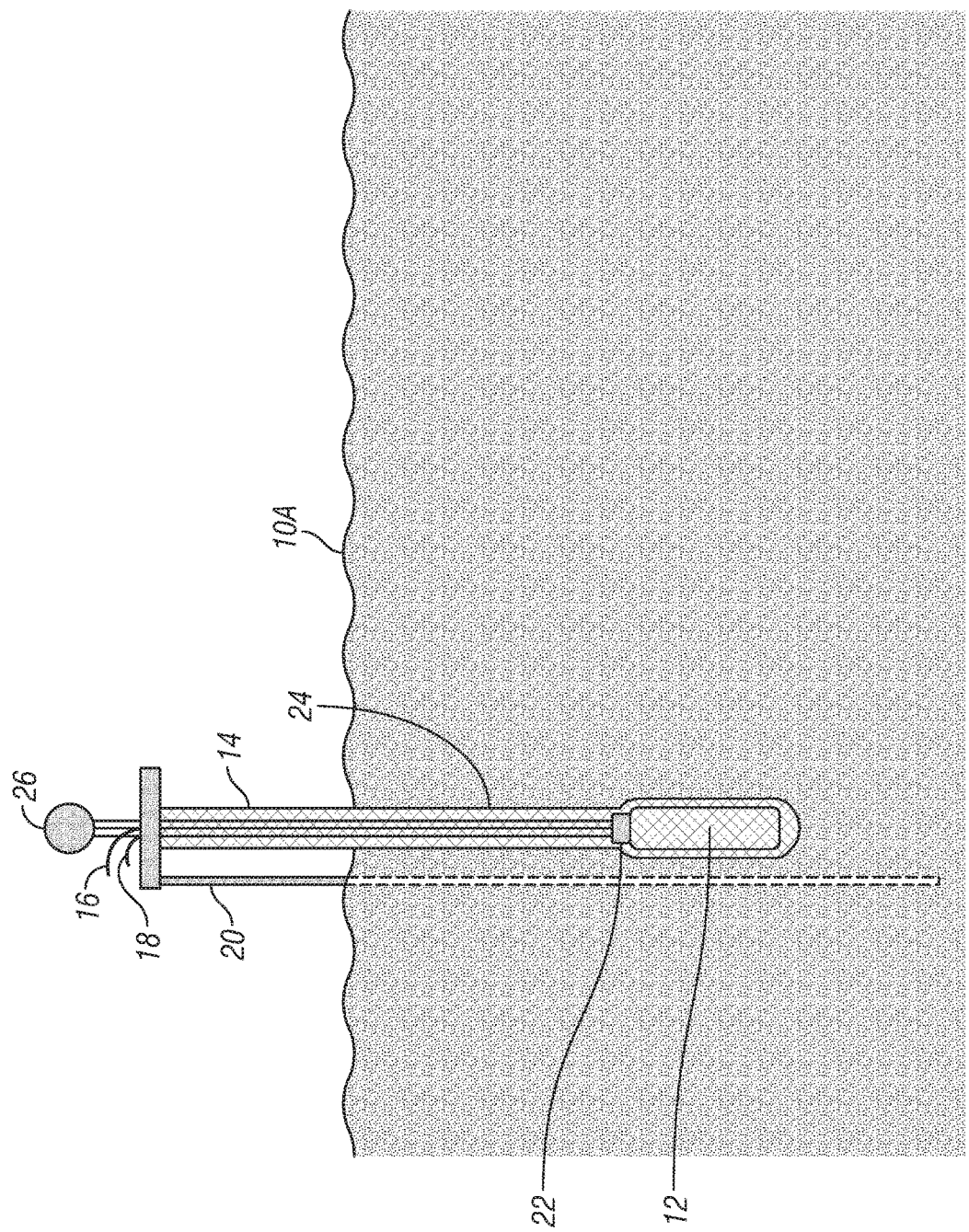
FIG. 2 shows another example embodiment of a sleeve that may be used in sand, mud or other loose material cover above a subsurface area to be surveyed.

FIG. 2 shows another possible embodiment for deployment below the surface of sand, mud or other material that may consolidate and restrict removal of the sensor or sensor node 12 at some time after deployment. All of the components set forth with reference to FIG. 1 may be used in the embodiment of FIG. 2, however the heating element and associated cable connections may be omitted.

The embodiments shown in FIGS. 1 and 2 contemplate placing the entire sensor or sensor node (12 in FIGS. 1 and 2) inside the sleeve (14 in FIGS. 1 and 2), wherein the sleeve 14 has a closed end. In other examples, the sleeve 14 may be coupled to or affixed to the cap (22 in FIGS. 1 and 2). In still other examples, and end of the sleeve 14 may be affixed to the sensor or sensor node by placing and end thereof at the top of the sensor or sensor node and then affixing the cap 22 so as to lock the end of the sleeve 14 in place.

Figure 3:
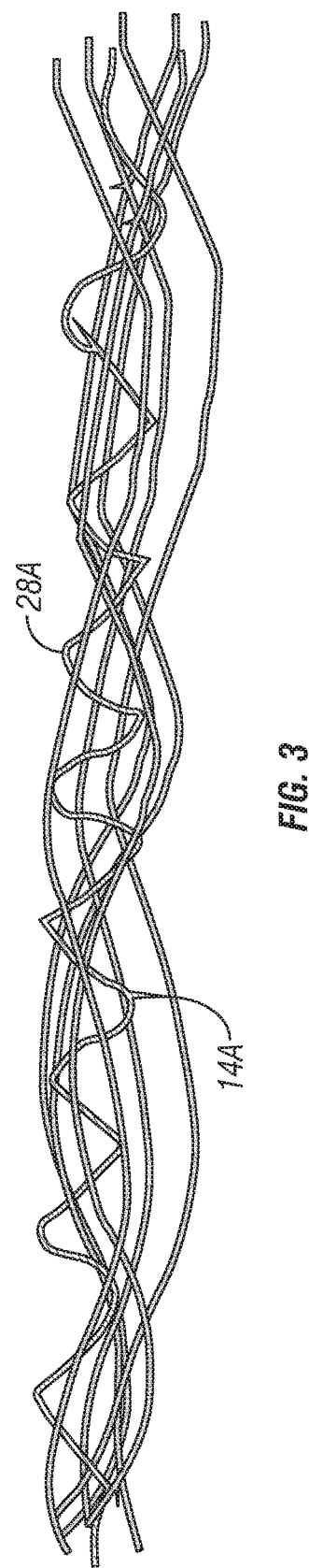
FIG. 3 shows an example of electrical resistance heating wire used in example embodiment such as the one shown in FIG. 1.

FIG. 3 shows an example of a braided weave of high strength fiber 14A used to form the sensor sleeve (14 in FIG. 1) wherein an electrical resistance heating element 28A may be woven integrally with the weave of the fiber forming the sensor sleeve (14 in FIG. 1). Other electrical cables or wires may be similarly woven into the fiber weave from which the sensor sleeve (14 in FIG. 1) may be formed so that when the sensor sleeve (14 in FIG. 1) is pulled upwardly to remove the sensor sleeve from the hole (24 in FIG. 1 or 2, e.g., as in either the embodiment of FIG. 1 after melting the ice by operating the heating element or merely by upward pulling as in the embodiment of FIG. 2) extension of the length of the braid forming the sensor sleeve will not apply excessive elongation to the electrical conductors or the heating element (if used).

Figure 4:
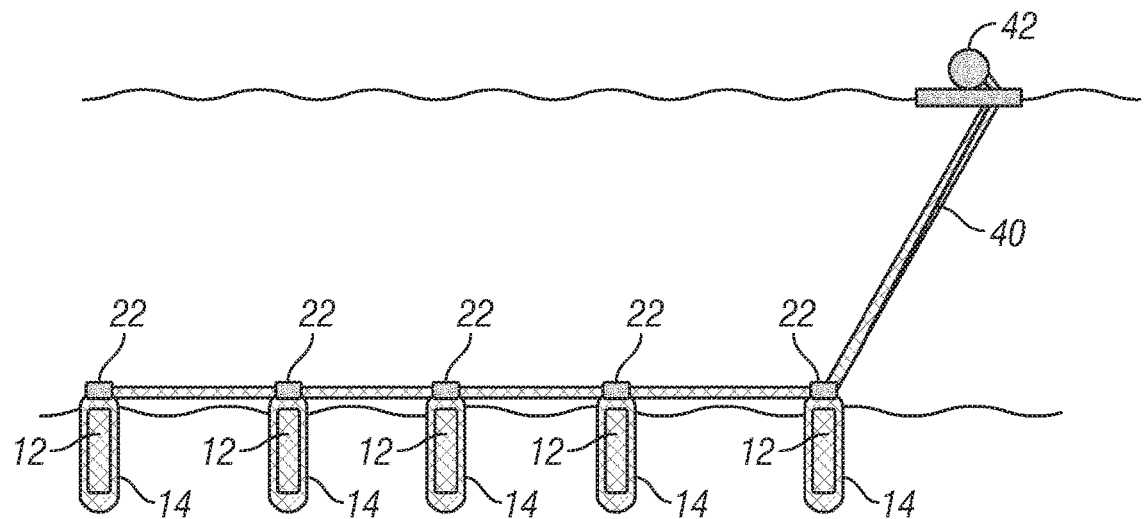
FIG. 4 shows an example of a line of sensors or recording nodes deployed into the water bottom, on a single line that may be deployed by hand or automated, as with a reel.
Figure 5:
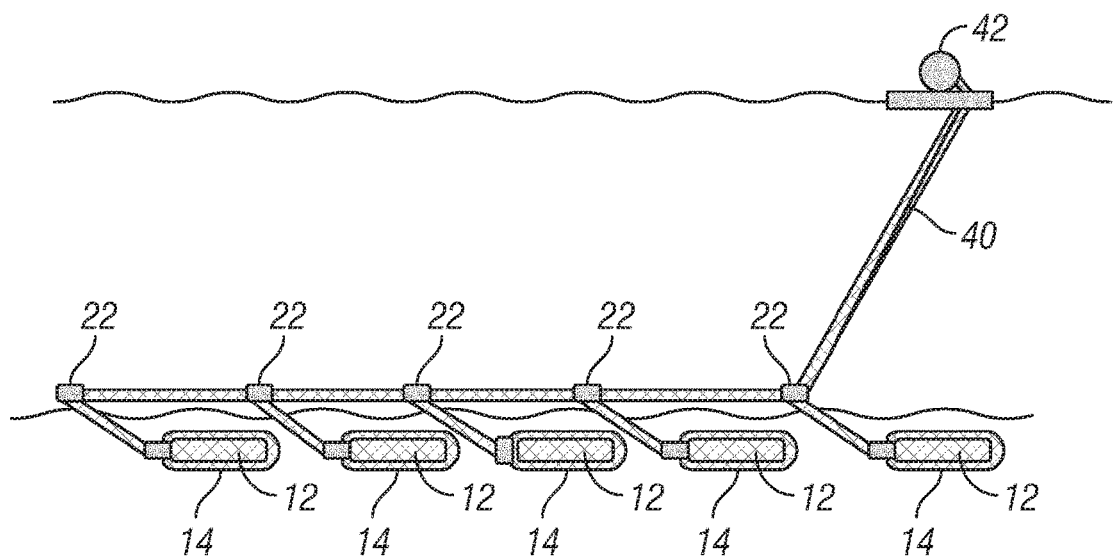
FIG. 5 shows an example of a line of sensors or recording nodes deployed laying on the water bottom, on a single line that may be deployed by hand or automated, as with a reel. These units may be hydrophones, dual component phones with a hydrophone and or geophones in a gimbal unit, or solid state geophones.

Referring to FIGS. 4 and 5, a sensor sleeve 14 having a sensor or sensor node 12 therein may be connected to other sensor sleeves 14 with sensors or sensor nodes therein using a cable 40 such as an electrical cable. The cable 40 may be coupled to each sensor or node cap 22; each cap 22 may be coupled to an end of the respective sleeve 14. The foregoing may form a selected pattern of sensors or sensor nodes all connected to a same antenna and communication system, e.g., as shown at 42. The selected pattern of sensors of sensor nodes may be deployed and retrieved with mechanized and automated equipment. The sensors or nodes may be deployed and retrieved by an automated system using a reel or linear puller. A number of such independent and individual selected patterns, e.g., lines, may be deployed in succession, forming a line of geophysical sensors or nodes of any selected length.

Figure 6:
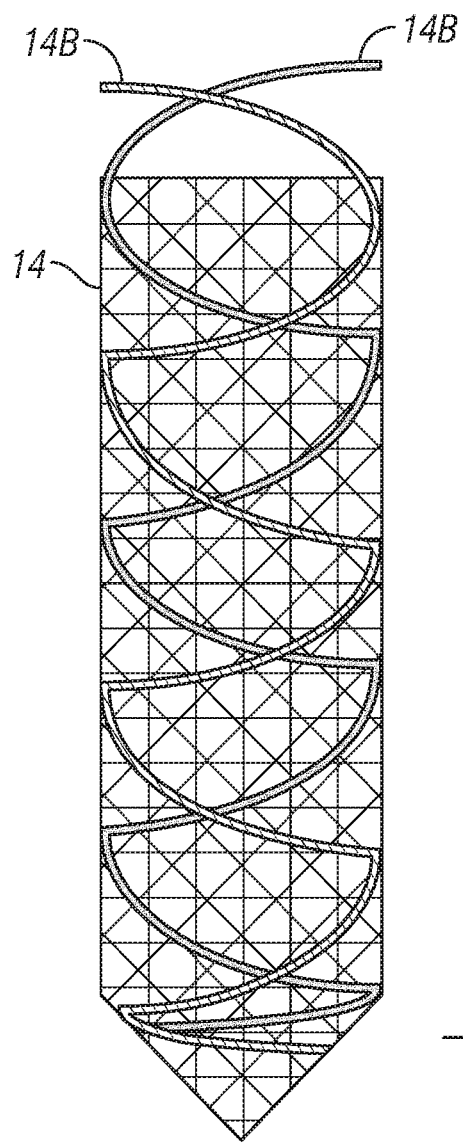
FIGS. 6 and 7 show an example weave pattern for a sensor or node sleeve.
Figure 7:
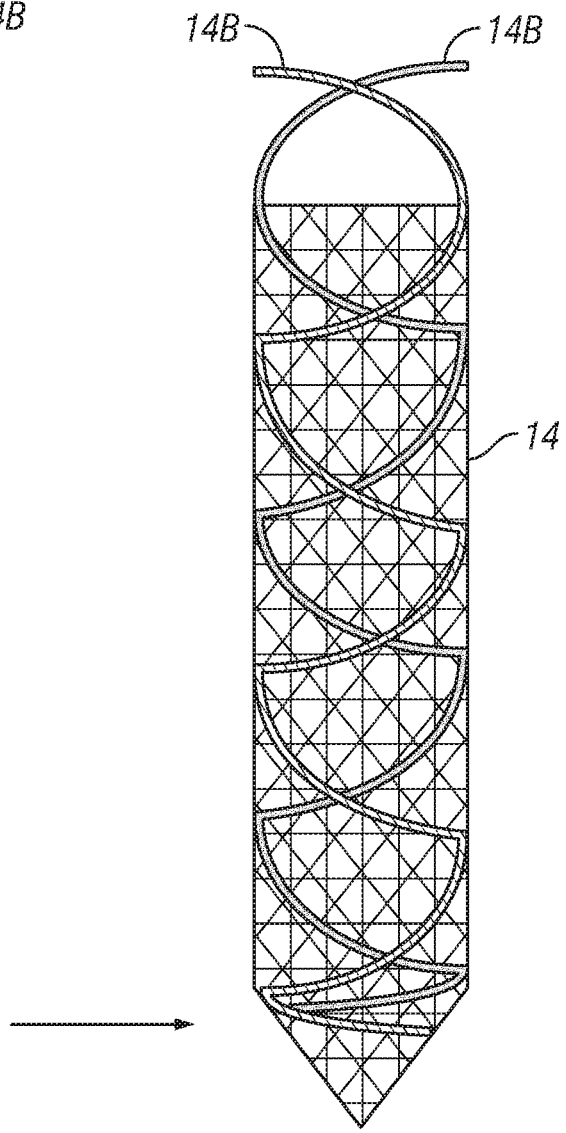

In one embodiment, and referring to FIGS. 6 and 7, a composite woven material for use with a sensor or sensor node sleeve according to the present disclosure may include carbon fiber. Carbon fiber is a desirable material for the transmission of acoustic energy. The above described woven sleeve may have the following features separated by properties: composition, weave design to obtain selected mechanical properties and heating from the passage of electric current through the carbon fibers.

Carbon fiber not only provides excellent transmission of acoustic energy, but also is a semiconductor that will generate heat when electric current is passed through the fiber. In one embodiment, the ground contact sleeve is comprised of a range of 1 to 100% carbon fiber, with a preferred range of 2.5 to 50%. A composite fiber may comprise the foregoing fractional amounts of carbon fiber, with the remainder of the woven fiber comprising synthetic woven fibers such as the KEVLAR brand or the AMSTEEL brand fibers described above, braided nylon, polyester, and/or polypropylene.

In some embodiments, and with reference to FIGS. 6 and 7, the weave arrangement for the sleeve 14 may include one or more fibers 14B arranged such that pulling on the node sleeve 14 in the longitudinal direction results in constriction of the woven fiber around the sensor or node in the lateral direction. FIG. 6 shows the node or sensor sleeve 14 laterally expanded. FIG. 7 shows the sleeve 14 laterally contracted by longitudinal pulling on the one or more fibers 14B. Thus, transverse extensions of the sensor or node sleeve above the height of the sensor or node may cause constrictions of the node sleeve 14 to form a tight fit with the sensor or node. As a non-limiting example, one type of fiber or thread, e.g., carbon fiber, may be helically woven and have extensions that when pulled longitudinally result in the constriction of the woven fibers laterally. This portion of the sleeve, which may be referred to as the constrictive portion, may be used to aid retrieval. In some embodiments, the constrictive portion may extend from 12 to 30 inches longitudinally, with a preferred longitudinal extension range of 15 to 25 inches. The longitudinal dimension of the entire sleeve 14, including the constrictive portion, may be in a range from 12 to 60 inches, with a preferred range of 24 to 48 inches. The longitudinal dimensions described herein are only examples and are not intended to limit the scope of the present disclosure.

Finally, the composite netting includes an insulted conductor for the transmission for signals for communication.

The insertion and removal of a netting retrieval tool may be performed manually, or automatically. In one embodiment, a pilot hole may be prepared that is slightly smaller in diameter than the outer diameter of the sensor or sensor node. The sensor of sensor node is inserted into the sensor or node sleeve, and the end pulled to constrict the sleeve around the diameter of the sensor or sensor node. Then the node and node sleeve are inserted into the pilot hole. The sleeve extension may extends beyond the sensor or sensor node to aid locating and recovery of the sensor or sensor node at the end of the intended time of use of the sensor or sensor node.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A geophysical sensor deployment sleeve, comprising an electrically non-conductive fiber woven into a shape of a tube open at one end and closed at the other end, the woven fiber having a tensile strength such that upward force applied to the open end of the tube is capable of removal of a sensor or sensor recording node disposed in the tube and embedded in a hole below a ground surface irrespective of consolidated materials infiltrating and/or covering the tube below ground level.

2. The geophysical sensor deployment sleeve of claim 1 further comprising an electromagnetic signal coupling device disposed in the woven fiber such that the electromagnetic signal coupling device is disposed proximate a corresponding electromagnetic signal coupling in the sensor or sensor recording node deployed in the geophysical sensor deployment sleeve.

3. The geophysical sensor deployment sleeve of claim 1 further comprising a support stand coupled to a part of the woven fiber tube extending above the ground level.

4. The geophysical sensor deployment sleeve of claim 1 further comprising at least one antenna coupled to electrical cables in signal communication with the sensor or sensor recording node disposed in the sensor sleeve, the at least one antenna disposed above the ground level and communicating signals between the sensor or sensor recording node and a remote device.

5. The geophysical sensor deployment sleeve of claim 1 wherein the woven fiber comprises at least one of an insulated electrical conductor and an electrically operated heating element.

6. The geophysical sensor deployment sleeve of claim 5 wherein the electrically operated heating element comprises one of resistance wire and electrically conductively coated, electrically non-conductive fiber.

7. A method for deploying a geophysical sensor, comprising
at least one of inserting a geophysical sensor in a woven fiber tube and coupling the geophysical sensor to the woven fiber tube, the tube comprising a woven electrically non-conductive fiber open at one end and closed at the other end, the woven fiber having a tensile strength such that upward force applied to the open end of the tube is capable of removal of a sensor or sensor recording node disposed in the tube in a hole below a ground surface irrespective of consolidated materials infiltrating and/or covering the tube below ground level; and
pushing the geophysical sensor into ground at least partially below the ground surface.

8. The method of claim 7 wherein the tube further comprises an electromagnetic signal coupling disposed in the woven fiber such that the electromagnetic signal coupling is disposed proximate a corresponding electromagnetic signal coupling in the geophysical sensor, the method further comprising communicating signals from the geophysical sensor to the electromagnetic signal coupling to an antenna disposed above the ground level.

9. The method of claim 8 further comprising using the antenna to communicate signals between the sensor and a device located away from the sensor.

10. The method of claim 7 further comprising coupling a support to a part of the tube extending above the ground level.

11. The method of claim 7 wherein the tube comprises an electrically operated heating element, and passing electrical current through the heating element to enable removal of the sensor from material at the ground level susceptible to freezing.

12. The method of claim 11 wherein the electrically operated heating element comprises at least one of resistance wire, carbon fiber and electrically conductively coated, electrically non-conductive fiber.

13. The method of claim 7 further comprising coupling a plurality of geophysical sensors each disposed in a respective woven fiber tube to a cable, each tube connected to the cable and pushing each of the plurality of sensors into the ground at least partially below the ground surface.

14. The method of claim 13 further comprising pulling on the cable to remove the plurality of sensors from the ground.

* * * * *